(12) United States Patent
Hartwig et al.

(10) Patent No.: US 11,639,269 B2
(45) Date of Patent: May 2, 2023

(54) APPARATUS AND METHOD FOR TRANSPORTING CONTAINERS

(71) Applicant: KRONES AG, Neutraubling (DE)

(72) Inventors: Miriam Hartwig, Schwandorf (DE); Tobias Puerzer, Seubersdorf (DE); Thomas Lehner, Geisling (DE)

(73) Assignee: KRONES AG, Neutraubling (DE)

( * ) Notice: Subject to any disclaimer, the term of this patent is extended or adjusted under 35 U.S.C. 154(b) by 119 days.

(21) Appl. No.: 17/048,258

(22) PCT Filed: Apr. 23, 2019

(86) PCT No.: PCT/EP2019/060286
§ 371 (c)(1),
(2) Date: Oct. 16, 2020

(87) PCT Pub. No.: WO2019/206858
PCT Pub. Date: Oct. 31, 2019

(65) Prior Publication Data
US 2021/0039889 A1    Feb. 11, 2021

(30) Foreign Application Priority Data
Apr. 23, 2018 (DE) .................... 10 2018 109 637.2

(51) Int. Cl.
*B65G 13/10* (2006.01)
*B65G 47/54* (2006.01)
*B65G 13/08* (2006.01)

(52) U.S. Cl.
CPC ............. *B65G 13/10* (2013.01); *B65G 47/54* (2013.01); *B65G 13/08* (2013.01); *B65G 2201/0235* (2013.01)

(58) Field of Classification Search
CPC ........ B65G 13/10; B65G 13/08; B65G 47/54; B65G 2201/0235
(Continued)

(56) References Cited

U.S. PATENT DOCUMENTS

| | | | | |
|---|---|---|---|---|
| 1,917,004 A | * | 7/1933 | Worrall ............... | B65G 47/487 198/569 |
| 3,246,733 A | * | 4/1966 | Torbet ................... | B65G 47/82 198/370.07 |

(Continued)

FOREIGN PATENT DOCUMENTS

| | | |
|---|---|---|
| DE | 2424037 B2 | 6/1976 |
| DE | 2717542 A1 | 10/1978 |

(Continued)

OTHER PUBLICATIONS

International Search Report dated Jul. 11, 2019 for PCT/EP2019/060286.

*Primary Examiner* — James R Bidwell
(74) *Attorney, Agent, or Firm* — Schmeiser, Olsen & Watts, LLP

(57) ABSTRACT

Provided is an apparatus for transporting objects and in particular containers and/or liquid containers with a first conveyor device which is arranged at least temporarily below the objects to be conveyed and which conveys the objects, wherein the conveyor device includes a point device, and a feed section which conveys the objects to the point device, and wherein the objects are selectively conveyable along at least a first discharge section and a second discharge section by the point device, wherein the feed section extends substantially rectilinearly and wherein the first discharge section follows the feed section in a rectilinear manner and the second discharge section deviates from the rectilinear course of the feed section, and wherein the apparatus includes a selection tool for selectively conveying the objects onto the first discharge section or the second discharge section.

20 Claims, 2 Drawing Sheets

(58) Field of Classification Search
USPC .......................... 198/457.05, 457.07, 370.01
See application file for complete search history.

(56) References Cited

U.S. PATENT DOCUMENTS

| | | | | | |
|---|---|---|---|---|---|
| 3,334,723 | A | * | 8/1967 | Reed | B65G 47/54 |
| | | | | | 198/370.09 |
| 3,343,639 | A | * | 9/1967 | Eliassen | B65G 13/10 |
| | | | | | 193/36 |
| 3,512,638 | A | | 5/1970 | Chengges et al. | |
| 3,570,648 | A | * | 3/1971 | Gillespie, Jr. | B65G 47/82 |
| | | | | | 198/457.07 |
| 7,810,630 | B2 | * | 10/2010 | Duchemin | B65G 47/841 |
| | | | | | 198/457.06 |
| 2007/0034478 | A1 | * | 2/2007 | Wolf | B65G 21/06 |
| | | | | | 198/370.1 |
| 2007/0221471 | A1 | * | 9/2007 | Fourney | B65G 17/24 |
| | | | | | 198/779 |
| 2010/0006393 | A1 | * | 1/2010 | LeCroy | B65G 47/766 |
| | | | | | 198/370.02 |

FOREIGN PATENT DOCUMENTS

| | | | | | |
|---|---|---|---|---|---|
| EP | 2666738 | A1 | 11/2013 | | |
| FR | 2176534 | A1 | 11/1973 | | |
| GB | 2134891 | | * | 8/1984 | ............. B65H 29/60 |
| JP | H04-101912 | A | 4/1992 | | |

\* cited by examiner

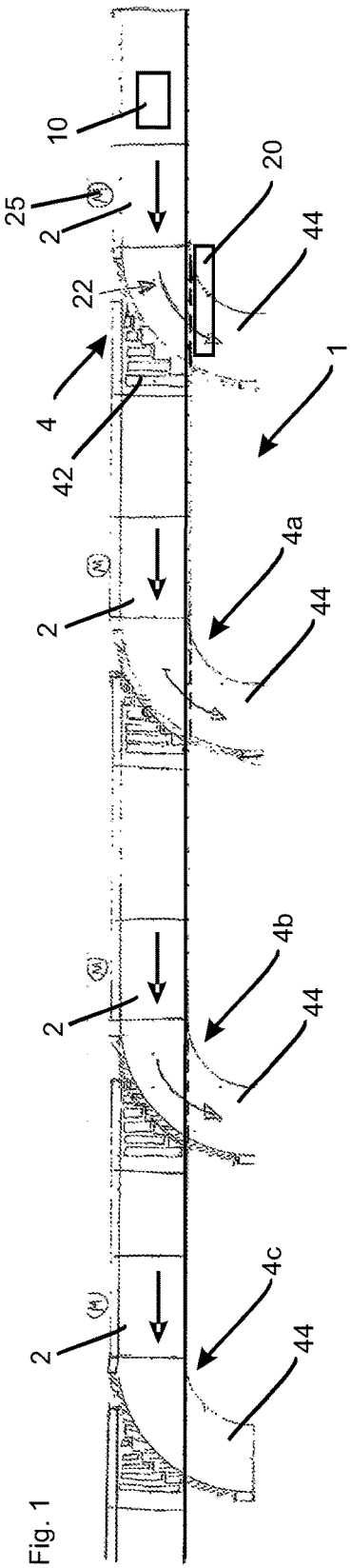
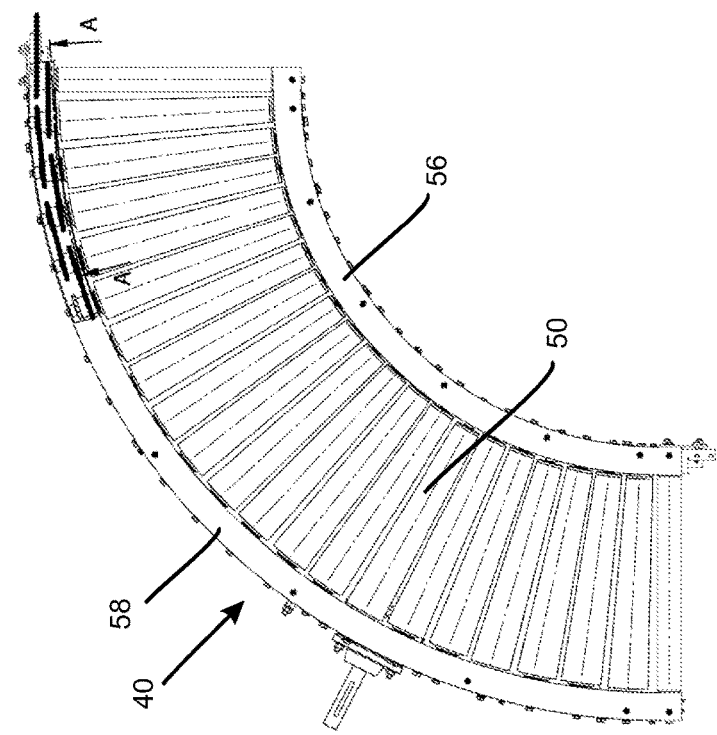
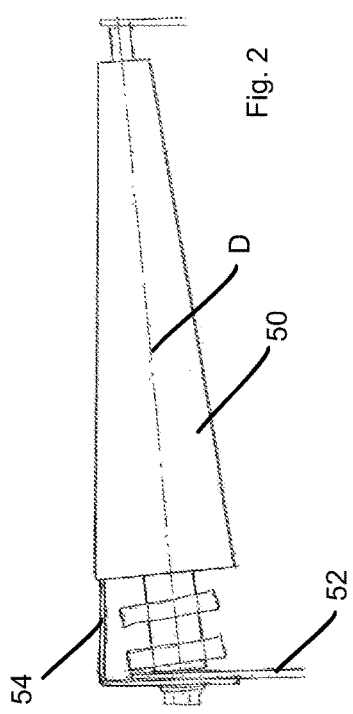
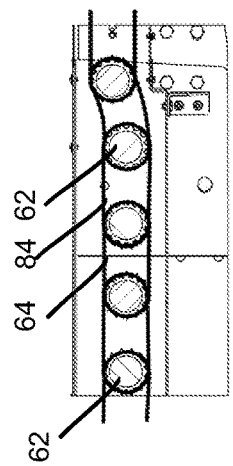
Fig. 1
Fig. 3
Fig. 2
Fig. 4

APPARATUS AND METHOD FOR TRANSPORTING CONTAINERS

CROSS-REFERENCE TO RELATED APPLICATIONS

This application claims priority to PCT Application No. PCT/EP2019/060286, having a filing date of Apr. 23, 2019, based on German Application No. 10 2018 109 637.2, having a filing date of Apr. 23, 2018, the entire contents both of which are hereby incorporated by reference.

FIELD OF TECHNOLOGY

The following relates to an apparatus and a method for transporting objects and in particular containers and/or liquid containers and in particular beverage containers. A large number of such transport devices are known from the conventional art. Usually these transport devices are conveyor belts, transport rollers or transport chains and the like which transport the objects along a predetermined transport path. It is often necessary to eject certain objects, for example because they are defective or because they have to be distributed to other transport routes.

BACKGROUND

For example, conveyors are known from the conventional art in which the objects are conveyed in a straight line and, if they are to be discharged, are rejected via a so-called segment diverter. This segment diverter can divert an incoming container at a certain angle onto a laterally mounted discharge conveyor (which is also arranged perpendicular to the first conveyor belt).

While the main conveyor line runs straight ahead, the segment diverter changes the direction of travel of selected products or objects. Depending on the running direction and shape of the products, twisting or wedging can occur at any time. Therefore the position of the segment diverter often has to be determined by several tests. There is no regulation for the exact alignment of the individual elements.

The orientation must be adapted to the customer product on site. This results in increased testing and assembly work for the customer. Commissioning can also be significantly delayed.

SUMMARY

An aspect relates to reducing such assembly work for such conveyor belts. According to embodiments of the invention, these objects are achieved by the subject-matter of the independent patent claims. Advantageous embodiments and further developments are the subject matter of the sub-claims.

An apparatus according to embodiments of the invention for transporting objects and in particular containers and/or liquid containers has a first conveyor device which is arranged at least temporarily and/or at least partially below the objects to be conveyed and which conveys the objects. The conveyor device has a point device and a feed section which conveys the objects to the point device and furthermore the objects are conveyed by the point device optionally along at least a first discharge section and a second discharge section or can be conveyed accordingly. The objects can also be boxes or crates.

The feed section runs essentially in a straight line and the first discharge section follows the feed section in a straight line. The second outfeed section deviates from the straight line of the first infeed section.

The apparatus further comprises selection tools for selectively conveying objects to the first discharge section or the second discharge section, the selection tools comprising at least one contact device for urging the objects, the selection tools being switchable between a first state in which it does not influence the direction of movement of the objects and a second state in which it changes the direction of movement of the objects.

The point device has a conveyor for conveying the objects and this conveyor has especially a multitude of conveyor rollers, which convey the objects on these rollers (and/or which are suitable and intended for this purpose).

According to embodiments of the invention, the point device conveys the objects in the first state of the selection tools to the second discharge section.

It is therefore proposed in the context of embodiments of the invention that by default, i.e. without intervention of the selection tools, the objects are conveyed in the path deviating from the rectilinear path. Nevertheless, the rectilinear transport path maybe the transport path along which the objects are conveyed in the control state. It is therefore possible that the contact device keeps the majority of the objects on an essentially straight transport path.

Thus, embodiments of the invention are based on a complete segment conveyor and segment diverter in a finished design. On the other hand, the conveyor device or apparatus is designed differently than is usual in the conventional art. The conveyor device is not only designed as a straight-line conveyor on which the product is discharged in a curved shape, but vice versa as a curved conveyor on which the product can be further conveyed in a straight line by the segment device (here referred to as a selection tool).

Therefore, if the selection tool does not intervene, the objects are conveyed along a transport path that is curved or deviates from the straight direction. In another advantageous embodiment, the objects are conveyed horizontally.

In another advantageous embodiment design, the objects are selected from a group of objects that includes beverage crates, barrels, shrink-wrapped containers and the like. In case of an embodiment, the objects have a mass which is greater than 100 g, or greater than 300 g, or greater than 500 g, or greater than 1 kg, or greater than 2 kg and or especially greater than 3 kg.

In another embodiment, the objects have a mass that is less than 50 kg, or less than 40 kg, or less than 30 kg.

Therefore, the transport device described here is particularly suitable and intended for transporting such objects. This means that, for example, the transport elements of the transport device are suitable and intended for conveying objects with the above-mentioned masses.

Another embodiment is an active and/or driven transport device. This means that the objects are actively conveyed and/or at least one means of transport or transportation device is driven by a drive device. This can be driven rollers and/or driven conveyor belts, transport chains or similar. The transport device is driven in the area of the second discharge section.

As mentioned above, the transport device is located at least partially below the objects to be transported. However, it would also be possible that components of this transport device are positioned differently, for example laterally next to the transport path of the objects to be transported.

In the context of embodiments of the invention, a point device is understood to be a device which has, in particular, an in feeding transport path and at least two transport paths deviating therefrom. However, it would also be possible that the point device even has three outgoing transport paths.

In an embodiment, the point device has a conveyor device which conveys the objects along a curved transport path. It is possible that the objects are conveyed along a transport path curved by at least 30°, or at least 40°, or at least 50° and at least 60° or at least 70°. In particular, the objects are conveyed by the point device along a transport path curved by 90°.

In another embodiment, at least one conveyor path of the objects and in particular the conveyor path along the curved transport path is determined by a geometry of the conveyor rollers. This means that a geometry of the conveyor rollers, and in particular the truncated cone geometry of the conveyor rollers described in more detail below, results in the objects being transported along a curved transport path.

In particular, the objects are conveyed along the curved transport path without the aid of the selection tool. The objects are advantageous to be actively conveyed, i.e. the conveyor is an active or actively moved conveyor. However, conveying under the effect of gravity would also be possible. In another advantageous embodiment, the conveyor has a large number of conveyor rollers, which convey the objects on these rollers.

This means that the objects are conveyed successively from one roller to the next, and in particular the objects are conveyed along a curved transport path.

The contact device is understood to be, in particular, an element or device which contacts the objects in at least one area, whereby this contact causes, in particular, a change in the transport direction of the objects. This contact device is arranged laterally next to the transport path of the objects. In this way, the contact device contacts one side surface of the objects to be transported.

This contact device can take the form of a guide plate or guide rail, which is touched by the side surfaces of the objects and thus moves the objects from their original (arc-shaped) transport path.

This contact device is a pushing element, which deflects the objects from their transport path and in particular from their transport path determined by the point device through mechanical contact with the objects.

This contact device can also cause the objects to rotate about a vertical axis of rotation and/or a predetermined angle of rotation.

The contact device extends at least in sections along a rectilinear direction and in particular a direction which is parallel to the direction of movement of the objects in the feed section and/or coincides with this direction of movement.

In another advantageous embodiment, the conveyor device has a large number of conveyor rollers, which convey the objects on these rollers. These are rotating conveyor rollers. These conveyor rollers are driven and especially are these rollers arranged directly behind each other. In this way, the objects are conveyed from one conveyor roller to the next.

Therefore, at least one of these conveyor rollers is especially advantageous and advantageously several of these conveyor rollers and especially all of them are driven. The conveyor rollers can be driven by a single drive means or a single driver such as a chain. The movement of the individual conveyor rollers is coupled with each other in an advantageous way. This means that the conveyor rollers in particular can rotate at the same speed.

In another advantageous embodiment, at least one of these conveyor rollers and several of these conveyor rollers have a frustoconical cross-section. It is conceivable that this cross-section of the rollers increases in a direction pointing outwards with respect to the curvature of the transport path. In this way, the conveyor rollers can manage a curved transport of the objects. The widening cross section enables an overall curved conveyor surface of the individual rollers. The extent of the curvature may depend on the extent of the truncated cone shape of the individual rollers.

The conveyor device has at least two conveyor rollers, at least four conveyor rollers, at least six conveyor rollers, least eight conveyor rollers, at least ten conveyor rollers or at least twelve conveyor rollers.

In another advantageous embodiment, the axes of rotation of the individual conveyor devices are arranged at an angle or inclined. Here the axes of rotation can be inclined in such a way that they again result in a horizontal conveyor surface of the individual conveyor rollers or the upper sides. However, it would also be conceivable that the axes of rotation of the conveyor rollers are inclined in such a way that the surfaces themselves are not exactly horizontal, but in particular rise slightly radially outwards. In this way a kind of steep curve could be made possible.

In another advantageous embodiment, two conveyors are connected to the point device in the transport direction. These conveyors can be conveyor belts or transport chains in particular. These two conveyors convey the objects further from the points. Both conveyors are advantageous to convey the objects along an essentially straight path.

In another advantageous embodiment, the contact device is a flat urging element that can be moved into a transport path of the objects. For example, it could be a plate which contacts the objects and thus aligns them in the straight direction.

Another advantageous embodiment provides a large number of such contact devices. These contact devices are arranged one behind the other in the direction of movement of the objects.

In another embodiment, the contact device can be moved in a predetermined direction, and in particular in a direction perpendicular to the transport direction, in order to enter and/or leave the transport path of the objects.

The contact devices are advantageous to move in an essentially vertical direction in the transport path of the objects.

Separate drives can be assigned to the individual contact devices.

At least 3, or at least 4 or at least 5 contact devices are provided. A maximum of 20, or a maximum of 15 or especially a maximum of 10 contact devices.

Especially is that the contact devices together in the transport direction of the containers have a length expansion which is at least as large as the longest format of an object to be transported (for example a crate).

The segment width of a single contact device (in the direction of object travel) is determined to a large extent by the distance from object to object. The wider the contact device, the further the objects should be pulled apart, the higher the transport speed. If the contact devices are again made narrower, the price of the diverter device increases.

In another advantageous embodiment, the device has a position detection device to detect a position of the objects. This position detection device is a light barrier. This position detection device is arranged in the transport direction of the objects in front of the point device.

In another advantageous embodiment, the device also has a detection device for detecting a path of the objects and/or for detecting a transport speed of the objects. A rotary encoder is advantageous for this detection device.

A movement of the contact device can be controlled in such a way that when the transport device stops, the contact device also remains or dwells in a predetermined position.

In another embodiment, at least one contact device on a surface touching the objects has a coating which promotes sliding contact between the objects and the contact device. This can be a Teflon coating.

The object(s) is/are rejected preferentially by the change of direction of the conveyor device. Twisting or wedging can be excluded here. Products which continue to run straight ahead are prevented from changing direction by the selection tool or the contact device or the segment diverter.

This procedure is more gentle on the product and also more reliable in operation than the procedure in the above-mentioned conventional art, as it is easier to maintain a product in the current direction of travel than to change the direction of travel against the direction of conveyance.

In addition, the structure described here makes it possible to build a complete unit (the conveyor and the segment diverter are designed as one component). The reason for this is that the running direction of the selection tool no longer needs to be adjusted at a customer's site (only the measures for straight alignment need to be adjusted).

The advantages here relate to functional reliability, reproducibility and also simplified installation and commissioning.

In another advantageous embodiment, the contact device is located at least temporarily above the transport path of the objects. In a state in which the objects are not to be transported in a straight direction and are therefore to be transported on the curved transport path, the contact device is arranged above the transport path and especially above a conveyor belt or transport chain.

To activate the selection or here to move the objects along the straight transport path, the contact device is moved from top to bottom into the transport path of the containers. However, it would also be conceivable to move the contact device in the transport direction of the objects or against the transport direction into the transport path.

The contact device particularly prefers to push the objects into a straight-line transport.

In another embodiment, the contact device can also have a large number of contact elements. In particular, these contact elements can also be arranged one behind the other along the transport path of the objects. It would also be possible that these individual contact elements are also assigned to drive devices located one behind the other.

In another advantageous embodiment, the objects can be moved relative to the popoint device and in particular relative to the transport rollers, deviating from their transport direction.

In another advantageous embodiment, the device has at least one second point device, which is arranged after the first point device in the transport direction. In this way, objects can be rejected at several points.

Also more than two such point devices can be provided.

Embodiments of the present invention are further directed towards a method for transporting objects and in particular containers and/or liquid containers. In this process, the objects are transported with a first conveyor device, which is at least temporarily and/or at least partially below the or the objects to be conveyed, wherein this conveyor device comprises a point device, as well as a feed section which conveys the objects to the point device, and wherein the objects are conveyed by the point device optionally along a first discharge section and a second discharge section, wherein the feed section extends substantially rectilinearly and wherein the first discharge section adjoins the feed section in a rectilinear manner and the second discharge section deviates from the rectilinear course of the feed section, and wherein by a selection tool the objects are conveyed selectively onto the first discharge section or the second discharge section.

Furthermore, this selection tool urges the objects by at least one contact device and this selection tool is switched at least temporarily between a first state in which it does not influence the direction of movement of the objects and a second state in which it changes the direction of movement of the objects.

According to embodiments of the invention, the point mechanism conveys the objects in the first state of the selection tool (i.e. the section in which it does not influence the direction of movement of the objects) to the second discharge section.

It is therefore also proposed on the method side that the objects are conveyed along a curved path in a contactless state of the selection took or in a neutral state of the selection tool.

It should be noted that all the advantageous embodiments described above with reference to the method, which are in principle suitable and intended for carrying out certain methods, are in fact also used for the purposes mentioned in the following description of the method.

BRIEF DESCRIPTION

Some of the embodiments will be described in detail, with reference to the following figures, wherein like designations denote like members, wherein:

FIG. 1 shows a schematic view of a device for transporting objects according to embodiments of the invention;

FIG. 2 shows a view of a roller device;

FIG. 3 shows a view of a segment diverter;

FIG. 4 shows a view of the view shown in FIG. 3 along lines AA;

DETAILED DESCRIPTION

Figure 6A:
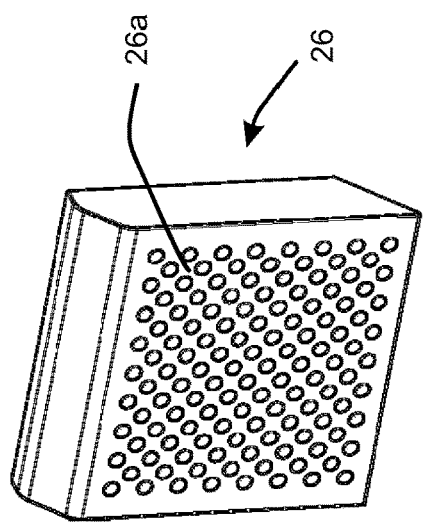
FIG. 6a shows a first view of a contact device.

FIG. 1 shows an overall view of a device 1 for transporting objects 10, which is in accordance with embodiments of the invention. These objects 10 are transported from right to left by the conveyor device here. The reference mark 25 identifies drives such as motors which drive the transport/conveyor devices.

The reference mark 4 indicates a point device which allows the objects to be conveyed either to a first discharge section 42, i.e. here straight ahead to the left, or to a second discharge section 44.

The reference mark 22 identifies the feed section where the objects 10 enter the point device. The first discharge section 42 is thus connected in a straight line to the first feed section 22.

The reference sign 20 indicates a selection tool by which it is possible to select which further transport path the objects 10 take starting from the point device 4. They can be conveyed either to the first discharge section 42 or, as mentioned, to the second discharge section 44.

Here the selection tool can have a contact surface or contact device 26, which in a first operating state of the selection tool touches a side surface of the objects 10, for example a side surface of the objects 10 (on the left in the view) and thus keeps them on the straight transport path or brings them to the first discharge section 42.

In particular, this point device 4 can be moved downwards perpendicular to the plane of the figure. In a non-activated state, i.e. in particular a state in which the selection tool 20 is set to the top, the objects are not conveyed straight ahead but to the second discharge section 44.

In the view shown in FIG. 1, several such point devices 4a, 4b and 4c are arranged one behind the other, so that the objects 10 can be sorted out at different positions.

FIG. 2 shows a roller device 50 for transporting objects. This rolling device is especially intended for the area of the point device. It can be seen that this roller device 50 has a truncated cone shaped cross section or surface which can be rotated in relation to an axis of rotation D. The reference mark 52 indicates a holder for holding the roller device. The reference mark 54 indicates a protective mechanism intended in particular to prevent injury to a user. This protective mechanism can be attached to the side of the actual roller device.

FIG. 3 shows in its entirety the segment diverter 40, by which the objects (not shown) can be transported and in particular conveyed to the second rejection segment 44 (see FIG. 1). It can be seen that a large number of rollers 50 with a truncated cone shaped cross-section are provided here, so that the objects 10 are also transported along the transport paths down here, i.e. along a curved transport path. The selection device can be inserted in an area of the segment diverter. The reference numbers 56 and 58 identify side elements which are used in particular to hold the roller units 50. These side elements do not protrude beyond the roller devices in the vertical direction. Therefore, these side elements should never contact the objects to be transported from the side.

The individual rollers can be driven in each case.

FIG. 4 shows the drive of the individual roller devices 50, where it can be seen that belt means or driver 84 (or chains) are arranged between adjacent rollers, thus enabling a synchronous or coupled drive of the individual roller ends 62. The belt means or driver 84 can be a toothed belt, for example, which interacts with corresponding toothed wheels 62.

The coupling described here enables all roller devices in particular to be operated synchronously with each other. However, it would also be possible to provide several motors to drive the individual roller devices. It would also be possible that individual roller devices are not driven.

Figure 5:
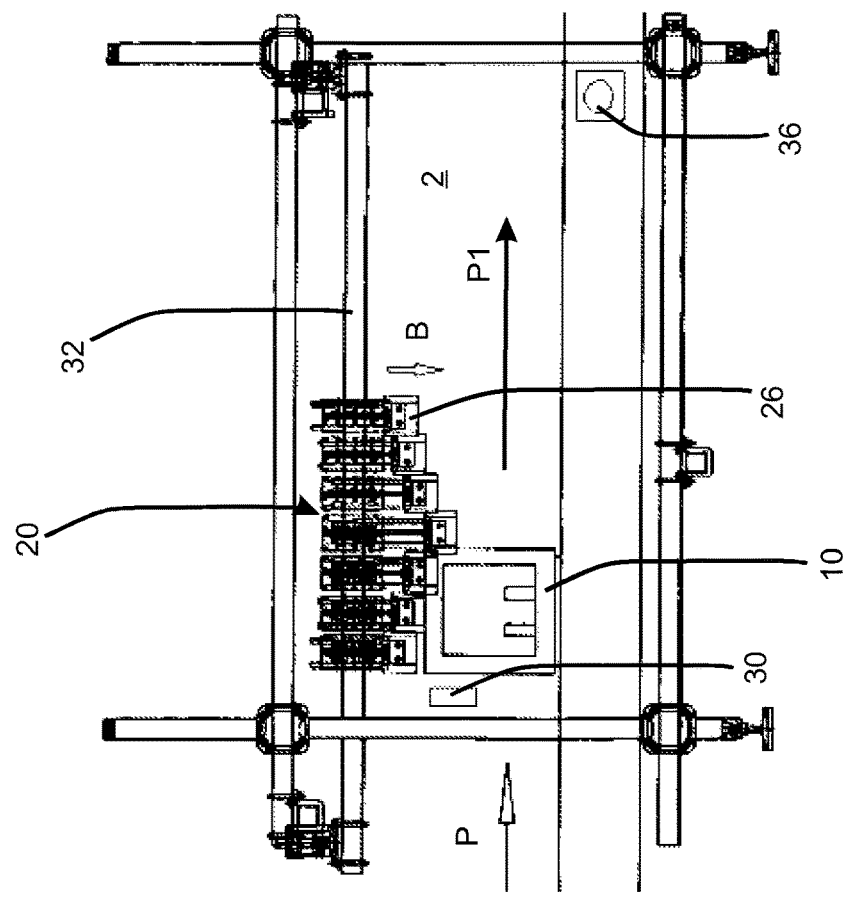
FIG. 5 shows a view of a point device.

FIG. 5 shows a view of a point device. Here again the transport/conveyor device 2 is shown, on which the objects are conveyed along transport path P. The reference symbol P1 indicates the (straight) transport path along which the objects are conveyed when the selection tool is active, i.e. when the contact devices 26 have entered the transport path of the objects.

FIG. 5 shows seven contact devices 26, which are arranged one behind the other in the transport direction of the objects. The reference symbol B indicates the direction of movement of the contact device. Here, they can be moved in a vertical direction into the transport path of the objects. The contact devices each have separate drives. When the contact devices 26 are fed in, they can be fed one after the other (in FIG. 5 from left to right) downwards (in direction B). The reference mark 32 identifies a carrier on which the contact devices are arranged.

The drives can be designed as pneumatic, hydraulic or electric drives, for example. A position-controlled linear motor is advantageous.

The reference mark 30 identifies a position detection device such as, in particular but not exclusively, a photoelectric sensor. This position detection device can output a signal to a control unit (not shown) which controls the drives of the contact devices.

The reference mark 36 identifies a movement detection device which detects a movement of the transport device 2. This could be, for example, a rotary encoder of a drive of the transport device.

Figure 6B:
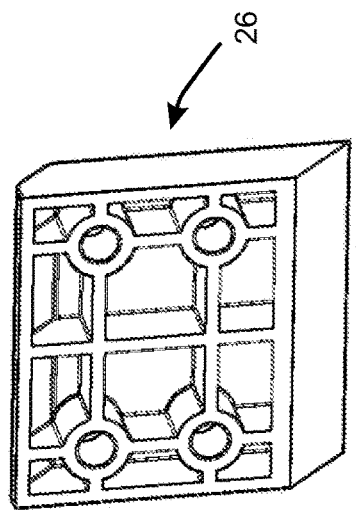
FIG. 6b shows a second view of the contact device.

FIGS. 6a and 6b show two views of the contact device 26, which can have a Teflon-coated surface 26a along which the objects can slide. Furthermore, the contact device can have inclined surfaces at its lower end which facilitate insertion into an object stream. The contact devices 26 can also be interchangeable in order to achieve an optimum (sliding) pairing between object and contact device 26.

The contact elements are manufactured using two-component 3D printing, in order to be able to produce the optimum material pairing on the one hand and to create closed, hygienically advantageous surfaces on the other. It is desirable to print only the necessary support structure inside the contact element to save material and weight.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

LIST OF REFERENCE SIGNS 1 device
2 conveyor device
4 point device
4a point device
4b point device
4c point device
10 objects
20 selection tool
22 feed section
25 drive
26 contact device
26a surface
30 position detection device
32 carrier
36 motion detection device
40 conveyor device (complete)
42 first discharge section (straight)
44 second discharge section (arched)
50 roller device (conical)
52 holder
54 protective mechanism
56 side element
58 side element
62 roll end
84 belt means or driver
D rotary axis
P transport path
P1 straight transport path
B direction of movement of the contact devices

The invention claimed is:

1. An apparatus for transporting containers with a first conveyor device which is arranged at least temporarily below the containers and which conveys the containers, wherein the conveyor device comprises a point device, and a feed section which conveys the containers to the point device, and wherein the containers are selectively conveyable along at least a first discharge section and a second discharge section by the point device, wherein the feed section extends substantially rectilinearly and wherein the first discharge section follows the feed section in a rectilinear manner and the second discharge section deviates from the rectilinear course of the feed section, and wherein the apparatus comprises a selection tool for selectively conveying the containers onto the first discharge section or the second discharge section, wherein the selection tool comprises at least one contact device for urging the containers, the selection tool being switchable between a first state in which it does not influence the direction of movement of the containers and a second state in which it changes the direction of movement of the containers, wherein the point device comprises a conveyor device for conveying the containers, and wherein the conveyor device comprises a plurality of conveyor rollers, which conveys the containers located on these rollers, wherein the point device conveys the containers in the first state of the selection tool into the second discharge section and the contact device in a state in which the containers are not transported in a straight direction, is arranged above the transport path of the containers, wherein, in order to displace the containers along the rectilinear transport path, the contact device is displaced from top to bottom into the transport path of the containers.

2. The apparatus according to claim 1, wherein the conveyor device conveys the containers along a curved transport path.

3. The apparatus according to claim 1, wherein at least one conveyor path of the containers is determined by a geometry of the conveyor rollers.

4. The apparatus according to claim 1, wherein one of these conveyor rollers or several of these conveyor rollers are driven.

5. The apparatus according to claim 1, wherein one of these conveyor rollers or several of these conveyor rollers have a frustoconical cross-section.

6. The apparatus according to claim 1, wherein two conveyor devices are connected to the point device in the transport direction of the containers.

7. The apparatus according to claim 1, wherein the contact device is a flat urging element displaceable into the transport path of the containers.

8. The apparatus according to claim 1, wherein the apparatus comprises at least one second point device, which is arranged in the transport direction after the first point device.

9. A method for transporting containers with a first conveyor device which is arranged at least temporarily below the containers to be conveyed and which conveys the containers, this conveyor device having a point device and a feed section, which conveys the containers to the point device and wherein the containers are conveyed by the point device selectively along at least a first discharge section or a second discharge section, wherein the feed section extends substantially rectilinearly and wherein the first discharge section adjoins the feed section in a rectilinear manner and the second discharge section deviates from the rectilinear course of the feed section, and wherein by a selection tool the containers are conveyed either to the first discharge section or the second discharge section, wherein this selection tool urges the containers by at least one contact device and wherein this selection tool is switched at least temporarily between a first state in which it does not influence the direction of movement of the containers and a second state in which it changes the direction of movement of the containers, wherein the point device conveys the containers in the first state of the selection tool into the second discharge section and the contact device in a state in which the containers are not transported in a straight direction, is arranged above the transport path of the containers, wherein, in order to displace the containers along the rectilinear transport path, the contact device is displaced from top to bottom into the transport path of the containers.

10. The apparatus according to claim 1, wherein if the selection tool does not intervene, the containers are conveyed along a transport path that is curved or deviates from the straight direction.

11. The apparatus according to claim 1, wherein the transport device is an active and driven transport device, so that the containers are actively conveyed.

12. The apparatus according to claim 11, wherein the transport device is driven in the area of the second discharge section.

13. The apparatus according to claim 1, wherein the contact device is an element or de-vice which contacts the containers in at least one area, wherein this contact causes a change in the transport direction of the containers.

14. The apparatus according to claim 13, wherein the contact device is arranged laterally next to the transport path of the containers and contacts one side surface of the containers to be transported.

15. The apparatus according to claim 1, wherein the contact device extends at least in sections along a rectilinear direction and a direction which is parallel to the direction of movement of the containers in the feed section and coincides with this direction of movement.

16. The apparatus according to claim 1, wherein a number of contact devices are arranged one behind the other in the direction of movement of the containers.

17. The apparatus according to claim 16, wherein at least 3 contact devices are provided.

18. The apparatus according to claim 1, wherein the contact device pushes the containers into a straight-line transport.

19. The apparatus according to claim 1, wherein the containers are selected from a group of containers that includes beverage crates, barrels, and shrink-wrapped containers.

20. The apparatus according to claim 1, wherein the containers have a mass which is greater than 3 kg and less than 30 kg.

* * * * *